(12) United States Patent
Dove et al.

(10) Patent No.: US 7,599,748 B2
(45) Date of Patent: *Oct. 6, 2009

(54) USE OF UNIFORM RESOURCE LOCATORS IN PROCESS CONTROL SYSTEM DOCUMENTATION

(75) Inventors: Andrew P. Dove, Austin, TX (US);
Larry O. Jundt, Round Rock, TX (US);
Trevor D. Schleiss, Austin, TX (US)

(73) Assignee: Fisher-Rosemount Systems, Inc., Austin, TX (US)

( * ) Notice: Subject to any disclaimer, the term of this patent is extended or adjusted under 35 U.S.C. 154(b) by 0 days.

This patent is subject to a terminal disclaimer.

(21) Appl. No.: 12/035,558

(22) Filed: Feb. 22, 2008

(65) Prior Publication Data

US 2008/0148172 A1    Jun. 19, 2008

Related U.S. Application Data

(62) Division of application No. 10/771,864, filed on Feb. 3, 2004, now Pat. No. 7,337,013, which is a division of application No. 09/264,395, filed on Mar. 8, 1999, now Pat. No. 6,691,280.

(51) Int. Cl.
G05B 15/02 (2006.01)
G05B 19/18 (2006.01)
G05B 11/01 (2006.01)
G05B 15/00 (2006.01)
G06F 3/00 (2006.01)
G06F 3/048 (2006.01)

(52) U.S. Cl. .............................. 700/17; 700/9; 700/18; 700/83; 715/700; 715/764; 715/771; 715/772; 707/506; 707/507; 707/513

(58) Field of Classification Search ..................... 700/9, 700/17, 18, 83; 715/700, 764, 771, 772; 707/506, 507, 513
See application file for complete search history.

(56) References Cited

U.S. PATENT DOCUMENTS

| 5,768,119 | A | 6/1998 | Havecost et al. |
| 5,801,942 | A | 9/1998 | Nixon et al. |
| 5,828,851 | A | 10/1998 | Nixon et al. |
| 5,838,563 | A | 11/1998 | Dove et al. |
| 6,088,707 | A | 7/2000 | Bates et al. |
| 6,198,479 | B1 | 3/2001 | Humpleman et al. |
| 6,347,398 | B1 | 2/2002 | Parthasarathy et al. |

OTHER PUBLICATIONS

Delta VM System Overview Brochure, Fisher-Rosemount Systems, 32 pages (1998).
Delta VM Product Data Sheet, Delta V Control Network, Workstation Specifications, Delta V Controller, Delta V Power Supplies, Delta V/I/O Subsystem, Delta V Diagnostics, Delta V Event Chronicle, Delta V Excel Add-in, Delta V Real-Time Data Server, 56 pages (1996).

Primary Examiner—Ronald D Hartman, Jr.
(74) Attorney, Agent, or Firm—Marshall, Gerstein & Borun LLP

(57) ABSTRACT

A uniform resource locator (URL) is embedded in computerized or digital documentation for a physical and/or a software process control element existing within a process control environment to thereby provide an automatic link to documentation or other applications that exist in other processing or data environments, such as in a word processing environment or in a data manipulation environment. The URL may include a generalized field having a descriptor that identifies a property of the process control element and that operates so that, when the URL is selected, the generalized field is replaced with the property identified by the descriptor.

27 Claims, 4 Drawing Sheets

USE OF UNIFORM RESOURCE LOCATORS IN PROCESS CONTROL SYSTEM DOCUMENTATION

CROSS-REFERENCE TO RELATED APPLICATIONS

This application is a divisional application of U.S. patent application Ser. No. 10/771,864, filed Feb. 3, 2004, now U.S. Pat. No. 7,337,013, which is a divisional application of U.S. patent application Ser. No. 09/264,395, filed Mar. 8, 1999.

FIELD OF THE INVENTION

The present invention relates generally to process control networks and, more specifically, to a device and method that enhances the documentation for process control systems using uniform resource locators.

DESCRIPTION OF THE RELATED ART

Process control systems, such as those used in chemical, petroleum or other processes, generally include a centralized process controller communicatively coupled to one or more field devices which may be, for example, valve positioners, switches, sensors (such as temperature, pressure and flow rate sensors), etc. These field devices perform physical control functions within the process (such as opening or closing a valve), take measurements within the process for use in controlling the operation of the process or perform any other desired function within the process. Historically, process controllers have been connected to field devices via one or more analog lines or buses which may carry, for example, 4-20 mA (milliamp) signals to and from the field devices. Generally speaking, the process controller receives signals indicative of measurements made by one or more field devices and/or other information pertaining to the field devices, uses this information to implement a control routine and then generates control signals which are sent via the buses to the field devices to thereby control the operation of the process.

In the past decade or so, there has been a move within the process control industry to implement field-based digital communications within the process control environment. In fact, the process control industry has developed a number of standard, open, digital or combined digital and analog communication protocols such as the HART®, PROFIBUS®, WORLDFIP®, Device-Net®, CAN and FOUNDATION™ Fieldbus (hereinafter "Fieldbus") protocols which generally enable more field devices to be connected to a particular bus, support more and faster communication between the field devices and the controller and/or allow field devices to send more and different types of information, such as information pertaining to the status and configuration of the field device itself, to the process controller. Furthermore, these standard digital protocols enable field devices made by different manufacturers to be used together within the same process control network.

With digital based control and communication, information pertaining to a device or an application (such as a software program) is typically made available to a user or operator in some standardized format within the control programming environment, i.e., within the protocol or software environment that actually implements control and/or communications within the process control network. For example, at least some of the above-identified communication protocols have specific fields for each process control element indicating the size of the element, the location of the element and a brief description of the element. However, the amount of memory or space provided for such information is typically very limited. In fact, in most cases, the description field for each process control element is limited to between 40 and 80 string characters. As a result, detailed documentation for process control elements is typically provided in a different environment, such as a word processing environment, which is more suitable for storing and displaying text documents having, for example, operating instructions, safety instructions, calibrating or trouble-shooting tips, etc. associated with each of the particular process control elements.

The description field related to each process control component within the control programming environment generally provides static text referring the user to the appropriate stand-alone documents in other programming environments. The user, upon viewing such information, must load the necessary software for viewing the stand-alone document and then must search for the document or otherwise call the document up to review the desired information for the process control element. This can be tedious and time consuming.

SUMMARY OF THE INVENTION

According to the present invention, uniform resource locators (URLs) are included in computerized documentation for a process control element, such as within the description field of a process control element, to provide an automatic link or connection to further documentation or a further application associated with the process control element. With URL(s) embedded into computerized documentation for a process control element, a user or an operator can automatically call related documentation or a related application for a process control element by merely selecting the URL(s).

Furthermore, a URL having a generalized field is embedded into computerized documentation for a process control element and, when selected, the generalized field is replaced with some information pertaining to the process control element, such as the name or location of the process control element or the name of a containing element (such as a process area or a node) of the process control element. In this manner, process control elements may be copied, renamed and changed without having to change the URL(s) provided in the documentation associated therewith.

DESCRIPTION OF THE PREFERRED EMBODIMENTS

Figure 1:
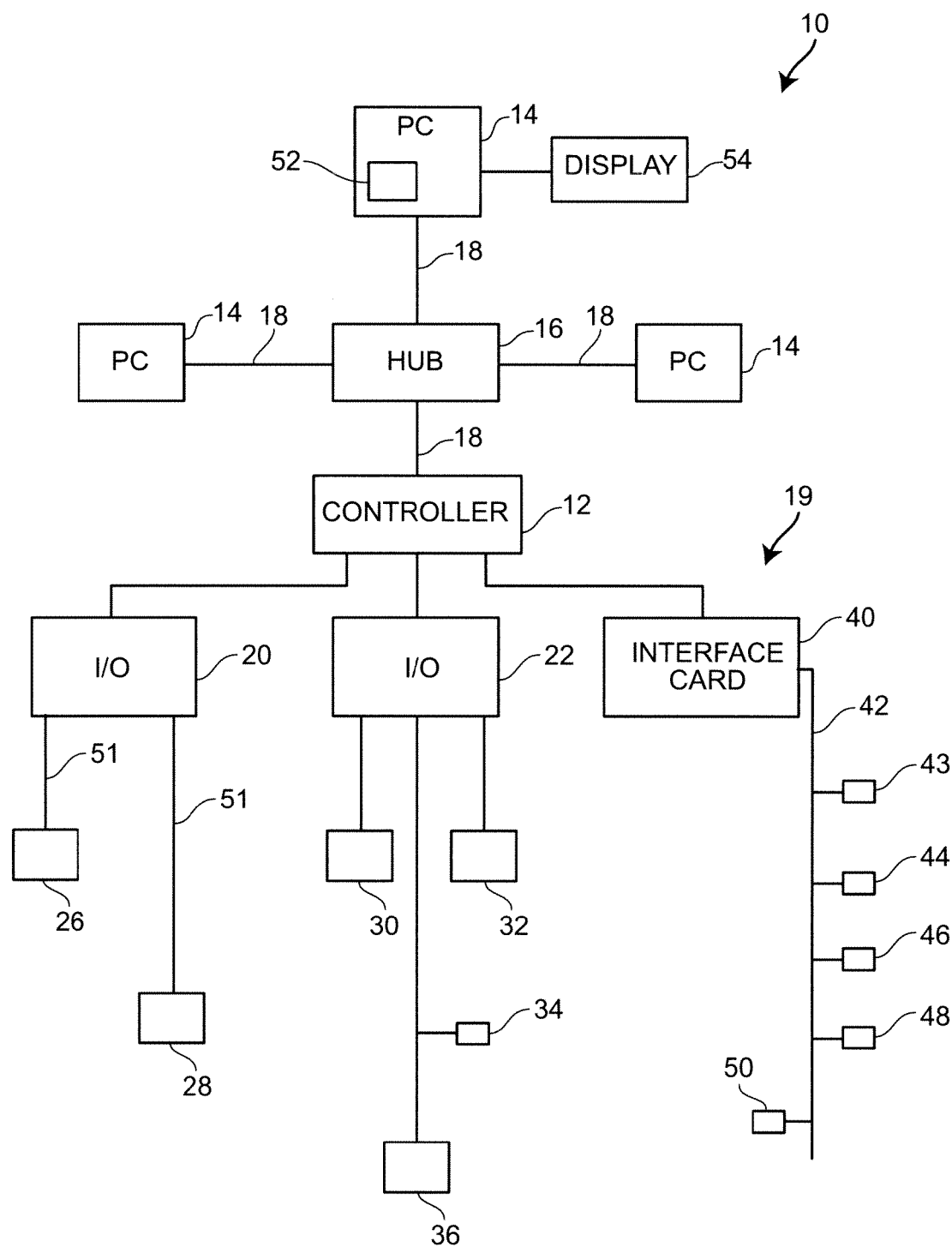
FIG. 1 is a schematic block diagram of a process control network.

Referring now to FIG. 1, a process control network 10 includes a process controller 12 capable of implementing a process control routine stored therein and of communicating with control elements, such as field devices and/or function blocks located within field devices distributed throughout the process control network 10. The controller 12, which can be by way of example only, the DeltaV™ controller sold by Fisher-Rosemount Systems, Inc., may be connected to numerous workstations such as personal computers (PCs) 14 via a hub 16 and ethernet connections 18. In turn, any of the PCs 14 may be connected to an external network, such as the internet (the World Wide Web), an intranet, or any other local area network or wide area network via appropriate physical and software connection mechanisms.

The controller 12 is also connected to numerous field devices located throughout a process (indicated generally by reference number 19). The controller 12 may communicate through standard I/O cards 20 and 22 to field devices 26, 28, 30, 32, 34 and 36 which are subject to centralized control from the controller 12 and may communicate via an interface card 40 and a bus 42 with numerous field devices 43, 44, 46, 48 and 50 which may perform process control functions in a distributed manner. By way of example only, the I/O card 20 may be an analog I/O card that connects the controller 12 to the field devices 26 and 28 using 4 to 20 mA buses 51. Likewise, the I/O card 22 may be a digital or combined digital and analog I/O card that communicates with digital or mixed digital and analog field devices 30, 32, 34 and 36 using any desired format. Still further, the interface card 40, the bus 42 and the field devices 43-50 may be Fieldbus components that communicate and interoperate using the Fieldbus protocol. Of course, the field devices 26-36 and 43-50 may be any types of field devices including, for example, transmitters, sensors, valve positioners, valve controllers, etc. Likewise, the controller 12 and the field devices of FIG. 1 may have any function blocks or other control components (such as applications) stored and/or executed therein to perform any desired control operations within the process 19.

In the configuration of FIG. 1, the PCs 14 (each of which has a memory 52 and a user display device 54, such as a CRT screen, associated therewith) may be used by one or more operators or users to communicate with the process controller 12, to review or change the status of the process control network 10, to obtain information pertaining to individual control elements such as the controller, the I/O devices, the field devices and function blocks within the process control network 10, etc. If desired, an application executed by one of the PCs 14 may provide a graphical depiction of the process control routine stored within the controller 12 illustrating the function blocks or other control elements within the process control routine and the manner in which these function blocks are linked together to provide control of the process 19. Likewise, an application, such as a browser application, may be used to view information pertaining to the configuration or make-up of the process control system 10 or any of the individual areas, devices, function blocks, etc. therein. Such a browser application may be similar to or the same as, for example, the MicroSoft™ Internet Explorer provided in a Windows95™, a Windows98™ or a WindowsNT™ environment.

Figure 2:
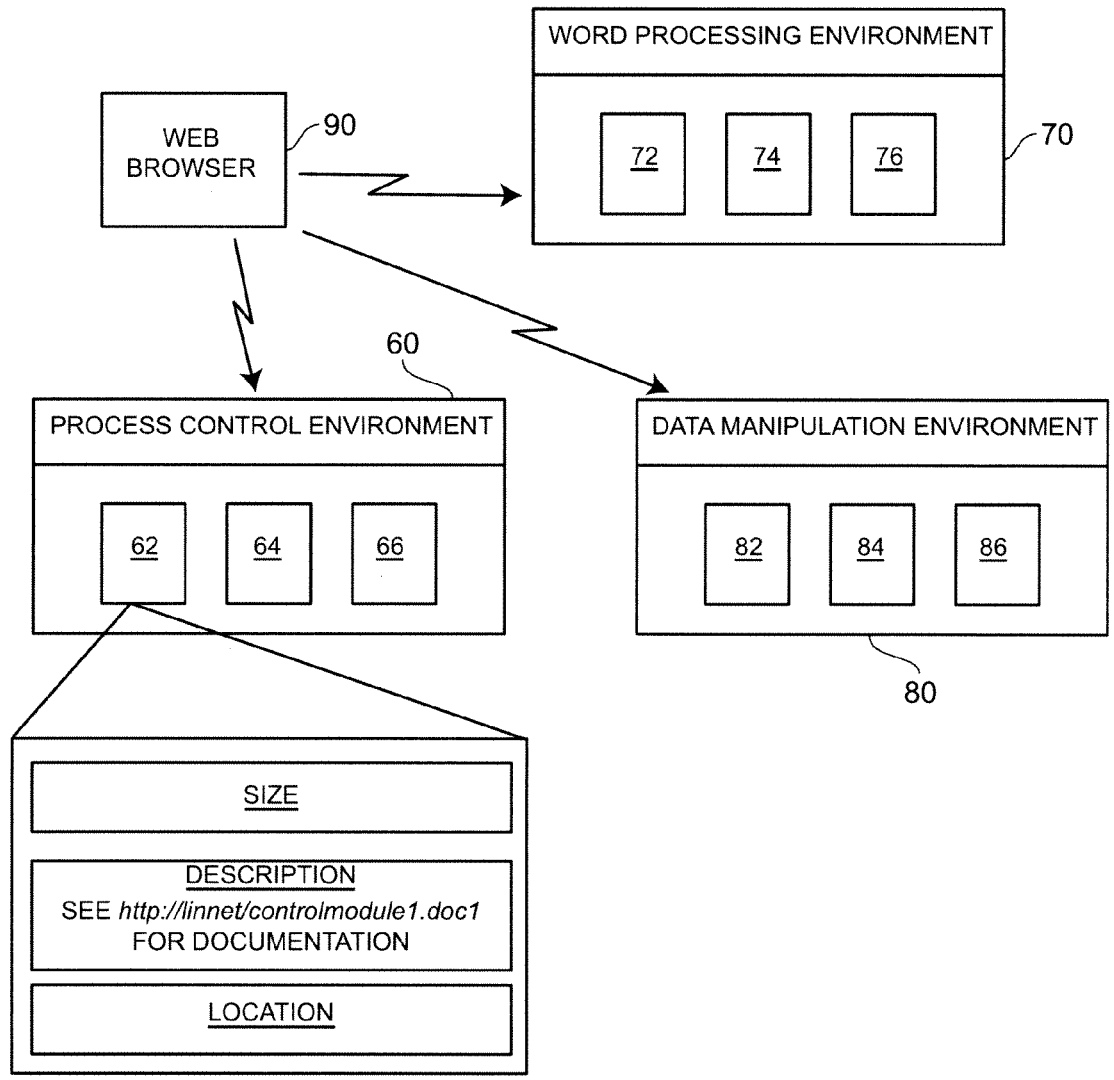
FIG. 2 is a schematic representation of numerous programming environments communicatively connected within a web network and a web browser which may access a document or application within one of the programming environments using a URL.

Referring now to FIG. 2, the process control system 10 may have a number of different programming environments associated therewith, such programming environments being provided anywhere in the network, like in the controller 12, any of the PCs 14 or in any device(s) communicatively coupled thereto via, for example, a local area network or a wide area network. The first such environment, illustrated in FIG. 2 as the box 60, is the process control programming environment in which the controller 12 operates to perform process control functions. Such a control programming environment may be that of the controller 12, which is typically defined by the manufacturer of the controller, but may also or instead be that associated with any communication or control protocol used in implementing control of the process 19, such as any of the digital or mixed digital and analog protocols identified above. Of course, any number of applications (user routines) may be provided in and run in the control programming environment, including routines that enable a user or operator to view information associated with the control elements used the process control system, to reconfigure or execute different control routines, etc. Control elements within this environment may be physical devices, such as field devices, the controller itself, I/O cards, workstations, memories, buses, communication lines or devices, may be software elements, such as function blocks, modules (fragments of process control software that execute control algorithms), libraries, applications (user programs), or may be combined physical and software elements. Some of these control elements are illustrated in FIG. 2 as blocks 62, 64 and 66.

Each of the control elements associated with or used in the process control system has one or more control function operators, which can be any physical, software or combined physical and software entity that performs some function or operation within the control programming environment. In physical devices, such as a valve, the control function operator may be one or more valve components that move in response to signals generated within the control programming environment. In a transmitter or sensor, the control function operator may be, for example, a sensing device that senses a process parameter or a transmitting device that transmits a signal indicative of a sensed parameter. Likewise, in a controller, the control function operator may be a CPU or a memory while in an input/output card, the control function operator may be a port or switching network, etc. necessary for operation of the input/output card. For pure software control elements, such as function blocks and modules, the control function operator can be any set of code which, when executed on a processor, performs some operation or function within a control or communication routine. Likewise, for libraries, the control function operator may be operation software that stores data in and/or retrieves data from the library memory. Of course these are merely examples of control function operators, there being many more such operators associated with these and other control elements.

Within the control programming environment, a control element and/or an application (e.g., a user routine) that operates to perform some function within that environment may have one or more standardized fields that provide information about a control element. In FIG. 2, the Size, Location and Description fields for the process control element 62 are illustrated in an exploded view. This information may be stored in a memory associated with the control element or may be stored in a memory associated with an application, such as a browser application, a control configuration application, an information gathering or storage application, etc., run in the process control programming environment 60. In this example, the process control element 62 is a function block and the Size, Location and Description fields associated therewith are viewed using standard dialog boxes in a Windows environment using an application that accesses these fields (if they are in a control element) or that stores these fields (if these fields are provided in the application). Generally speaking, the size of these fields is limited in the control programming environment due to the memory, textual limitations and processing restrictions associated with this environment.

As a result, other programming environments are used to supplement the documentation of the control elements. One other such environment, illustrated in FIG. 2 by the box 70, may be a word processing environment, such as that associated with Microsoft Word or WordPerfect. Of course, the word processing environment has a word processing application and numerous documents (illustrated as documents 72, 74 and 76 in FIG. 2) therein. One or more of these documents may be created to provide further documentation for a control element in the control programming environment providing, for example, safety instructions, operating instructions and the like for a control element.

Figure 3:
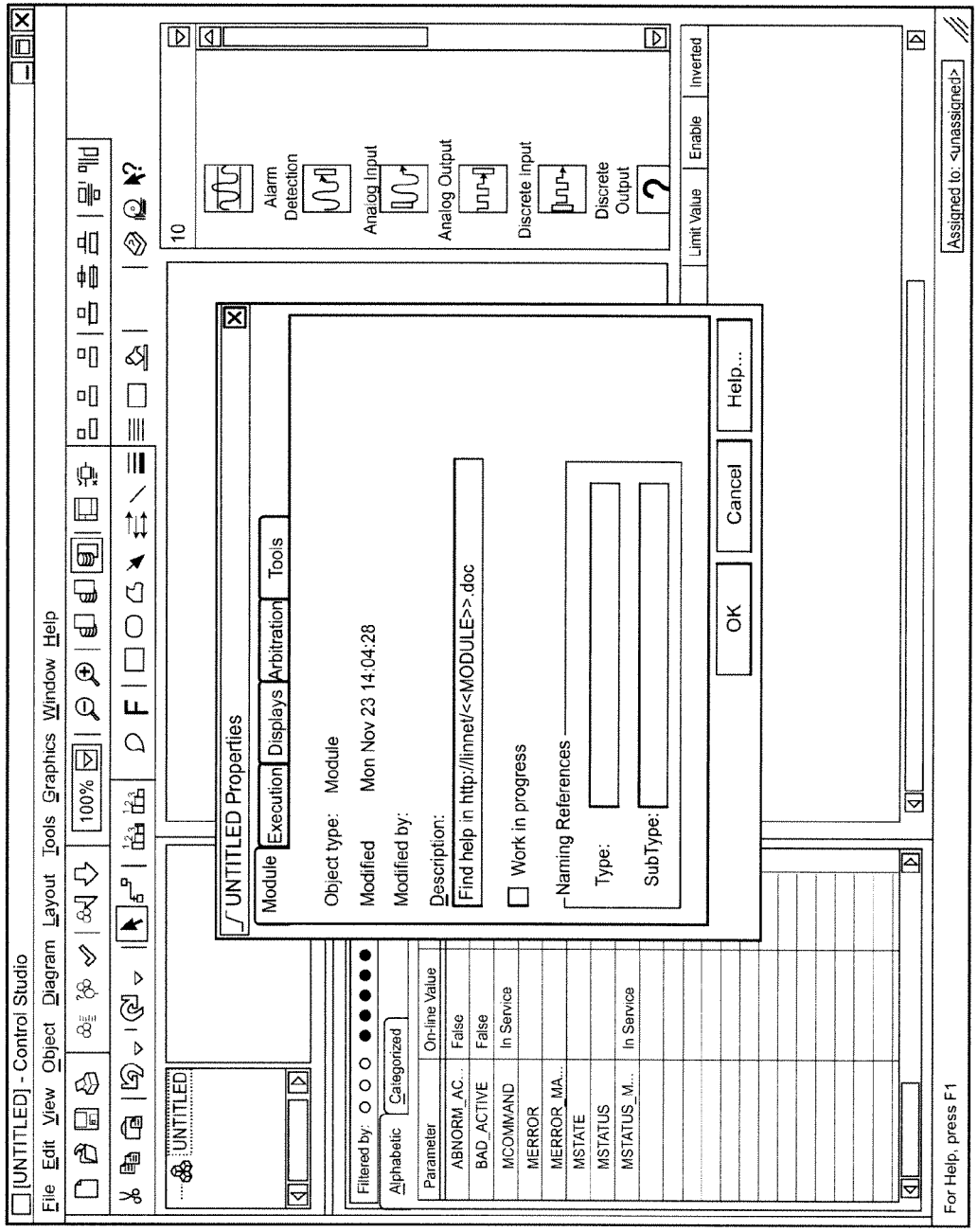
FIG. 3 is a depiction of a screen display illustrating the use of a URL to provide a link to documentation associated with a process control element.

Another example programming environment, illustrated in FIG. 3 by the box 80, that might be used to supplement documentation or to provide extended support for a control element is a data manipulation environment, such as that associated with an Excel or other spreadsheet program. This environment includes numerous entities, such as documents or files 82, 84 and 86, that can be called up, viewed and/or used to display and manipulate data associated with or obtained by one of the control elements in the control environment. Still other example programming environments may include, but are not limited to, video or graphical environments (like a PowerPoint or a CADCAM environment), database environments, algorithmic or mathematical based environments (such as accounting, inventory control, etc. software), multiuser information environments (like the World Wide Web, an intranet or other local area or wide area network) or environments which combine one or more of these features. While these environments are described herein as "programming environments," it is to be understood that the term "programming environment" as used herein is not limited to the use of particular types of programs or programming languages but is, instead, used in a broad sense to indicate any type of computer or digital operating or communication protocol used to perform some function or execute some application, and may be a data manipulation protocol, a communication protocol, a programming protocol, an information storage and retrieval protocol, etc.

While, in the past, one or more of these environments have been used to provide additional documentation or applications for a control element within the control programming environment, the user had to still call up the appropriate program, launch that program and then find the appropriate document or file within the subsidiary environment, which took time and could be tedious.

According to the present invention, a uniform resource locator (URL) is located or placed within the documentation for a process control element, wherein the URL points to a document or a file or some other entity in a different programming environment to enable a user to automatically launch (or enter) that new environment and call up the appropriate document. It will be understood that the documentation (i.e., the description field) and thereby the URL may be stored within the control element or within an application the uses or supports the control element. Generally speaking, the URL is a pointer or a link to a different program, document or file in a different programming environment that is, in some manner, related to a control element within the process control system. The URL should, of course, point to environments that exist within the same device or network as the control environment or that are communicatively coupled to a device or network in which the process control programming environment exists. Such connections may be provided via, for example, the controller 12 or a PC 14, an ethernet connection, the internet or any other local area network (such as an intranet) or a wide area network to which the process control system is coupled (either directly or via a wireless connection).

A URL may, for example, be located in the description field associated with a process control element in the control environment, as illustrated in the exploded view of the documentation fields for the control element 62 within the process control environment 60. Here, the subsidiary document name is "controlmodule1.doc1" and is to be found in the "linnet" local area network to which the control environment is coupled. Of course, such a URL can be placed in any field associated with, or in any part of the process control element or application within the process control environment, referred to herein generally as a description field, to serve the same purpose, i.e., launching a new environment and calling up a document or file within that environment related in some manner to the control element. Of course, if desired, the URL may point to a document, file, etc. within the control environment as well.

As will be understood, when selected (such as by placing the cursor over the URL and right clicking or double clicking on the URL in a Windows operating environment), the URL is sent to a web browser 90, which is preferably the default web browser on the computer or system in which the URL is selected. Using the URL, the browser 90 then finds and launches the appropriate programming environment, i.e., the appropriate application (such as a word processing application or a web page), calls up the referenced document or file within that environment and displays that document or file on the screen where the URL was selected. In this manner, the URL can be used to automatically call up documentation or other applications that are, for example, within programming environments other than the control programming environment, but which provide information on or applications that can be used for any of the control elements within the control programming environment. It will be understood that documentation for a control element may be placed in, for example, a word processing environment stored on the same computer (such as a user workstation or PC 14) or on the same network as the control programming environment located at the user site. Furthermore, by referencing documents provided by a manufacturer or supplier via, for example, the World Wide Web, the URL can refer a user to the most recent documentation provided for a control element. Of course, this assumes that a connection to the World Wide Web is available to the host computer or workstation within which the URL is selected.

Using the URL in this manner, a user or operator in the control programming environment does not have to manually call up or load different programming environments and find documents or files within those environments to find, read and/or use documentation or other applications associated with a control element. It will be understood that the URL may be stored any description field associated with a control entity. Such a description field includes any storage mechanism or format that, in any way, enables text (including a URL) to be stored in a memory and displayed on a user display device, such as a CRT screen, a gas plasma display screen, an LED display screen, a printer, etc.

Of course, the URL may take on any desired format which is preferably different in some manner than the other information or text within which the URL is placed. More particularly, the URL may be a different color than the other information within the control programming display field, may also or instead be underlined (to enable it to be viewed by persons who are color blind), may be in a different font style and/or type size or may have any other distinguishing characteristic(s) or attribute(s) to make it readily apparent to the user that the URL exists.

In one embodiment, the URL includes a generalized field therein having a descriptor which identifies some attribute or property of the control element for which the URL exists. For example, a URL for a module may take on the format of "www.companyname.com/<module.name>.doc", wherein the generalized field <module.name> is replaced by the actual name (the property) of the control module or element for which the URL exists before being processed by the web browser. In particular, when the application displaying the description field, recognizes that a user has selected a URL with a field in brackets, it replaces the bracketed field with the information or name specified in the brackets before passing the URL to the web browser 90. Of course any other type of information or name could be provided in the general field, such as the name of containing device (like the node or the area) in which the control element exists.

In a particular application, the URL is placed within the description field of the process control element or application 62 which uses an operating system similar to the Windows95, Windows98 or WindowsNT operating system. In this application, the URL is placed in a rich text field provided as a control within the dialog box of the operating system. When selected by a user, the operating systems notifies the application of an event. The application (which may be, for example, a DeltaV Explorer or Control Studio application) receives the URL from the rich text field within the Windows operating system as part of the event notification, analyzes the URL for the presence of a generalized field and, if it finds such a field, replaces the generalized field in the URL with the property specified by the descriptor in the generalized field. The application then uses, for example, a WIN32 system call to find and activate the default browser 90 and passes the changed URL to the default browser in any known or desired manner. The default browser 90 then finds the referenced document by launching the appropriate programming or other application to establish a different environment (if that environment is not already active) and calling up the referenced document on the screen. Of course, if the URL links to a word processing document in, for example, WordPerfect, the browser 90 calls up a WordPerfect document. Likewise, if the URL references an Excel spreadsheet file, the browser 90 calls ups an Excel file after running the Excel program. Similarly, if the URL points to some site within the World Wide Web, a local area network or an intranet, the default browser 90 calls up the appropriate software to access that site.

Placing a generalized field within the URL as described above makes use of the URL easier when the URL is provided in documentation for or associated with control elements that are implemented in software and which are prone to be copied to create other control elements. In particular, many control elements, such as function blocks or modules (which are typically made up of a number of function blocks), are stored in a library and are copied to produce particular instances of a function block or module. Because these new function blocks or modules may be altered somewhat before being used in a process control environment, or may be used for different purposes in the process control environment, different documentation is typically provided for these different elements. However, a static URL that is stored within the element and that refers to a particular and specific document in, for example, a word processing environment, will also be copied and will refer the user to the document for the original control element, not the copied control element. To change this, the user or operator must go into the new control element (or the documentation therefore within an application) and change the URL to indicate the documentation for the new and copied control element. This can be tedious and a designer or operator may forget to take this action, resulting in the wrong documentation for the new control element.

When a generalized field is placed within the URL, however, the copied URL within the new control element will automatically cause the URL to call up the documentation provided for the new control element based on some property (such as the name) of the new control element, which is typically changed when the new control element is copied and created. Of course, this assumes that the new documentation for the new control element is set up based on the name (or other property) of the control element. However, if this documentation naming configuration is followed, the URL with the generalized field will automatically refer to the new documentation for the new control element without being changed by the creator or designer of the new control element.

Of course any convention, besides the use of brackets, could be used to set up or specify the generalized field within the URL and the invention herein is not limited to the use of generalized URL fields set off by brackets. It should be noted, however, that it is preferable when choosing characters to use as field delimiters (such as the brackets above), it is best to choose characters that are not supported or recognized by the URL protocol to thereby avoid potential confusion. Using one or more generalized fields within a URL, to track a control element name, location, use, etc., makes the URL dynamic to thereby automatically track copies and renames of the control element in which the URL is embedded.

FIG. 3 depicts a screen display illustrating the properties of an untitled control element in the Control Studio of the DeltaV controller (made and sold by Fisher-Rosemount Systems, Inc.). It will be seen in FIG. 3 that the description field for this control element (having a module name "untitled") includes the URL http://linnet/<<MODULE>>.doc which, when selected, will cause the URL http://linnet/untitled.doc to be delivered to the web browser. If the module "untitled" is copied and/or named something else, for example, "loop1", the URL will be delivered to the web browser as http://linnet/loop1.doc without any specific change to the URL as provided in the documentation for the module.

Figure 4:
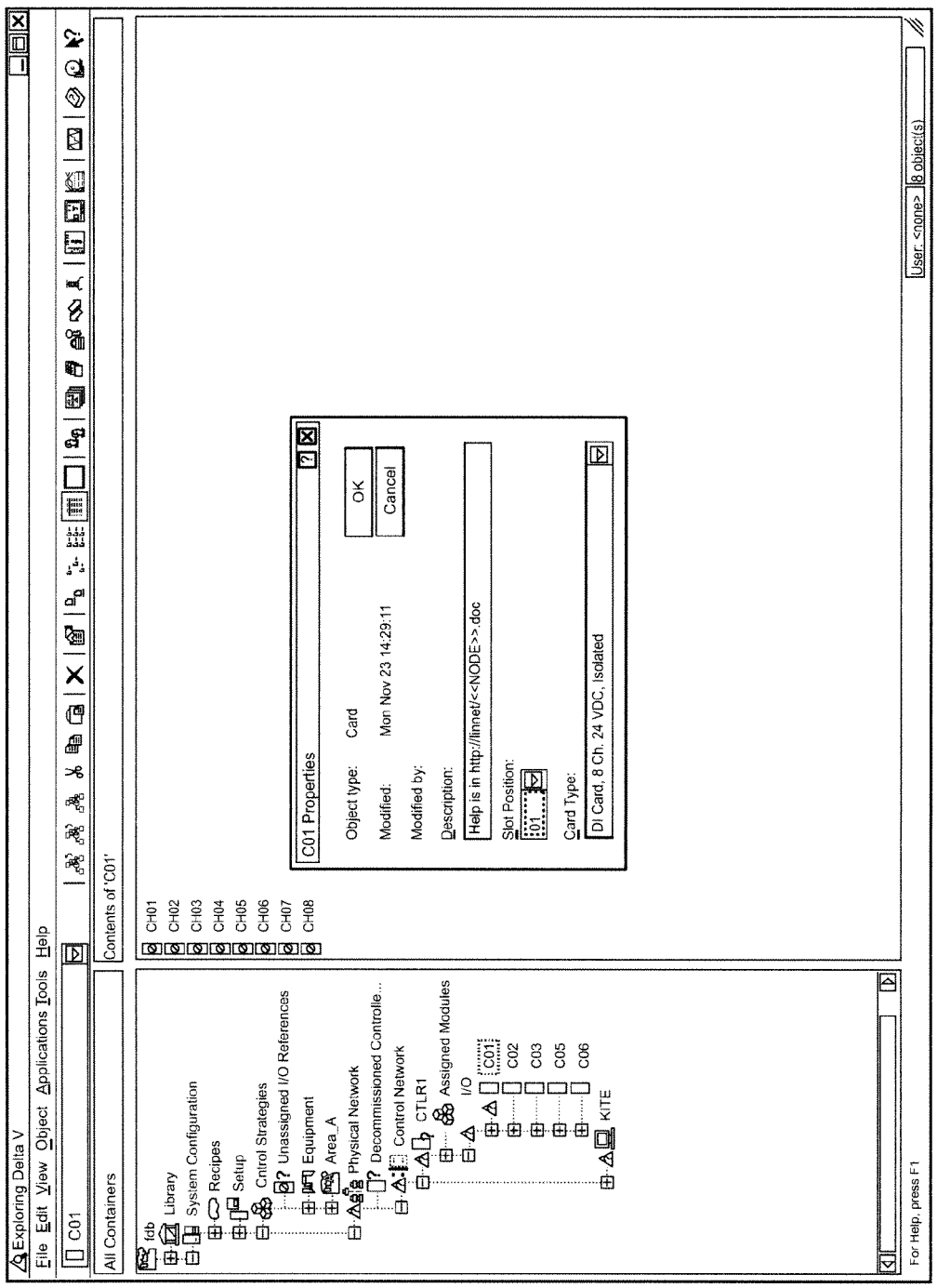
FIG. 4 is a depiction of a further screen display illustrating a further use of a URL to provide a link to other documentation associated with a further process control element.

FIG. 4 depicts a screen display in the DeltaV control environment illustrating, on the left hand side of the screen, the configuration of a process control network as provided by the DeltaV Explorer. This configuration includes a library, a number of recipes and control strategies and a physical network, all of which can be control elements having description fields therefore. Included within the physical network, is a number of input/output cards C01-C06, which are also control elements. As will be seen in FIG. 4, the control element C01 has been selected. On the right hand side of the screen, provided in a dialog box, the properties of the C01 card are illustrated and, within the description field, the URL http://linnet/<<NODE>>.doc is provided. This URL, which has a generalized field tied to the node associated with the card C01 (called CTLR1 in FIG. 4), can be used to automatically call up information in the form of a document pertaining to the C01 card.

It will be understood that URLs may be used to establish a connection or a link from the documentation of any process control element, including any device, application, module, function block, library, data structure, etc. to any other entity (e.g., document, application, file, etc.) associated with any programming environment. Moreover, while the description herein uses, as an example, DeltaV "function blocks" (which are very similar in configuration to Fieldbus function blocks), it is noted that the use of the expression "function block" herein is not limited to what the DeltaV or the Fieldbus protocols identify as a function block but, instead, includes any other type of block, program, hardware, firmware, etc., associated with any type of control system and/or communication protocol and that can be used to implement some control function. While function blocks typically take the form of objects within an object oriented programming environment, this need not be case and can, instead, be other logical units used to perform particular control (including input and output) functions within a process control environment. Still further, it will be understood that the use of URLs in process control system documentation can be provided in any type of field device, communication and/or controller protocol or environment, including protocols that rely on other than two-wire buses and protocols that support analog and/or digital communications, such as the HART, PROFIBUS, etc. communication protocols, or any other communication protocol that now exists or that may be developed in the future.

Of course the URLs used in process control system documentation as described herein are preferably implemented in software stored in or provided in any format on any computer readable memory such as on a magnetic disk, an optical (e.g., laser) disc, or other storage medium, in a RAM or ROM of a computer, controller, field device, etc. Likewise, process control element documentation having URLs therein may be delivered to a user or a device via any known or desired delivery method including, for example, over a communication channel such as an ethernet connection, a telephone line, the internet, etc.

While the present invention has been described with reference to specific examples, which are intended to be illustrative only and not to be limiting of the invention, it will be apparent to those of ordinary skill in the art that changes, additions or deletions may be made to the disclosed embodiments without departing from the spirit and scope of the invention.

What is claimed is:

1. A computer readable memory storing a process control application for implementation and use in a control programming environment associated with a process control system having a multiplicity of process control elements therein, the process control application when executed by a controller provides the following:
    a display having a plurality of display fields for one of the multiplicity of process control elements, each of said display fields including information displayed to a user and adapted to be stored in a memory within the process control system; and
    a context sensitive uniform resource locator disposed in one of the display fields of the display screen to point to an address of an external entity, the address to which the context sensitive uniform resource locator points dynamically changing in response to changes to an attribute value of the one of the multiplicity of process control elements.

2. The computer readable memory of claim 1, wherein the uniform resource locator includes a distinctive characteristic that distinguishes the uniform resource locator as a uniform resource locator when displayed.

3. The computer readable memory of claim 2, wherein the distinctive characteristic is underlining.

4. The computer readable memory of claim 2, wherein the distinctive characteristic is a particular color.

5. The computer readable memory of claim 1, wherein the uniform resource locator identifies an entity in a second programming environment that is a different programming environment than the control programming environment.

6. The computer readable memory of claim 5, wherein the second programming environment is a word processing environment.

7. The computer readable memory of claim 5, wherein the second programming environment is a World Wide Web environment.

8. The computer readable memory of claim 5, wherein the second programming environment is a local area network environment coupled to the process control system.

9. The computer readable memory of claim 1, wherein the one of the multiplicity of process control elements is a software element capable of being implemented on a processor within the process control system.

10. The computer readable memory of claim 9, wherein the one of the multiplicity of process control elements includes a function block.

11. The computer readable memory of claim 1, wherein the one of the multiplicity of process control elements is a physical device capable of being used within the process control system.

12. The computer readable memory of claim 1, wherein the uniform resource locator includes a generalized field that has a descriptor identifying a property of the one of the multiplicity of process control elements, and further including a routine that replaces the generalized field with the identified property of the one of the multiplicity of the process control elements to create a new uniform resource locator when the uniform resource locator is selected by a user.

13. The computer readable memory of claim 12, wherein the property of the one of the multiplicity of process control elements is the name of the one of the multiplicity of process control elements.

14. The computer readable memory of claim 12, wherein the property of the one of the multiplicity of process control elements is a location indication associated with a manner in which the one of the multiplicity of process control elements is located within the process control system.

15. The computer readable memory of claim 1, further including a browser that uses the uniform resource locator to locate and launch an entity in a second programming environment that is a different programming environment than the control programming environment.

16. The computer readable memory of claim 1, wherein the external entity is a text file.

17. The computer readable memory of claim 1, wherein the external entity is a program adapted to be executed on a processor.

18. The computer readable memory of claim 17, wherein the process control application is located in a first computer and the external entity is located in a second computer different than the first computer.

19. A computer readable memory storing a process control element adapted for implementation and use in a control programming environment associated with a process control system, the process control element when executed by a controller providing:
    a process function operator;
    a display having a plurality of display fields for the process function operator, each of said display fields including information displayed to a user and adapted to be stored in a memory within the process control system; and
    a context sensitive uniform resource locator disposed in one of the display fields of the display screen to point to an address of an external entity, the address to which the context sensitive uniform resource locator points dynamically changing in response to changes to an attribute value of the process function operator.

20. The computer readable memory of claim 19, wherein the uniform resource locator includes a plurality of distinctive characteristics which distinguish the uniform resource locator as a uniform resource locator.

21. The computer readable memory of claim 19, wherein the uniform resource locator identifies an entity in a second programming environment that is a different programming environment than the control programming environment.

22. The computer readable memory of claim 19, wherein the process function operator is a process control device.

23. The computer readable memory of claim 19, wherein the process function operator is a software element capable of being implemented on a processor within the process control system.

24. The computer readable memory of claim 19, wherein the uniform resource locator includes a generalized field that has descriptor identifying a property of the process function operator, which property of the process function operator replaces the generalized field of the uniform resource locator when the uniform resource locator is used.

25. The computer readable memory of claim 19, wherein the external entity is a text file.

26. The computer readable memory of claim 19, wherein the external entity is a program adapted to be executed on a processor.

27. The computer readable memory of claim 26, wherein the process control element is located in a first computer and the external entity is located in a second computer different than the first computer.

* * * * *

UNITED STATES PATENT AND TRADEMARK OFFICE
CERTIFICATE OF CORRECTION

| | | |
|---|---|---|
| PATENT NO. | : 7,599,748 B2 | Page 1 of 1 |
| APPLICATION NO. | : 12/035558 | |
| DATED | : October 6, 2009 | |
| INVENTOR(S) | : Andrew P. Dove et al. | |

It is certified that error appears in the above-identified patent and that said Letters Patent is hereby corrected as shown below:

At Column 7, line 23, "systems" should be -- system --.

Signed and Sealed this

Twenty-seventh Day of April, 2010

David J. Kappos
*Director of the United States Patent and Trademark Office*